United States Patent
Caggioni et al.

(10) Patent No.: US 8,160,057 B2
(45) Date of Patent: Apr. 17, 2012

(54) MULTI-CHANNEL OPTICAL TRANSPORT NETWORK TRAINING SIGNAL

(75) Inventors: Francesco Caggioni, Winchester, MA (US); Omer Acikel, San Diego, CA (US); Keith Conroy, Perkasie, PA (US)

(73) Assignee: Applied Micro Circuits Corporation, San Diego, CA (US)

( * ) Notice: Subject to any disclaimer, the term of this patent is extended or adjusted under 35 U.S.C. 154(b) by 632 days.

(21) Appl. No.: 12/164,440

(22) Filed: Jun. 30, 2008

(65) Prior Publication Data
US 2009/0324227 A1  Dec. 31, 2009

(51) Int. Cl.
*H04L 12/28* (2006.01)
(52) U.S. Cl. ........................................................ 370/351
(58) Field of Classification Search .................. 370/203, 370/229–236, 241–258, 395.1–395.5, 431–443, 370/464–479, 503–520, 537–540
See application file for complete search history.

(56) References Cited

U.S. PATENT DOCUMENTS

| 7,278,081 | B1 * | 10/2007 | Blair et al. .................... 714/752 |
| 2005/0053285 | A1 * | 3/2005 | Linkewitsch ................. 382/232 |
| 2005/0286521 | A1 * | 12/2005 | Chiang et al. ................. 370/389 |
| 2006/0146945 | A1 * | 7/2006 | Chow et al. .................... 375/260 |
| 2007/0092260 | A1 * | 4/2007 | Bontu et al. ................... 398/152 |

* cited by examiner

*Primary Examiner* — Kwang B Yao
*Assistant Examiner* — Jung-Jen Liu
(74) *Attorney, Agent, or Firm* — Law Office of Gerald Maliszewski; Gerald Maliszewski

(57) ABSTRACT

Systems and methods are provided for multi-channel ITU G.709 optical transport network (OTN) communications. The transmission method accepts an ITU G.709 OTN frame including an OTU overhead (OH) section and an ODU section. A forward error correction (FEC) parity section with a training signal is appended to the ITU G.709 OTN frame, to create a training-enhanced (TE) OTN frame. All, or a portion of the TE OTN may be buffered in a tangible memory medium in preparation for striping. The training-enhanced OTN frame is then striped into n parallel streams, and n TE_OTN-PFs (Parallel Frames) are supplied.

22 Claims, 6 Drawing Sheets

Fig. 7 *(PRIOR ART)*

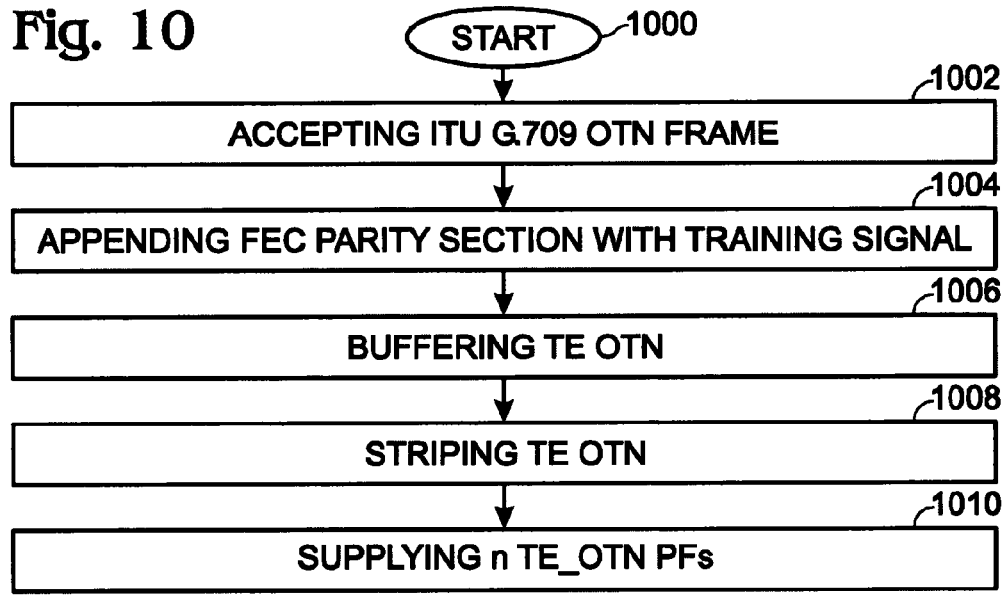
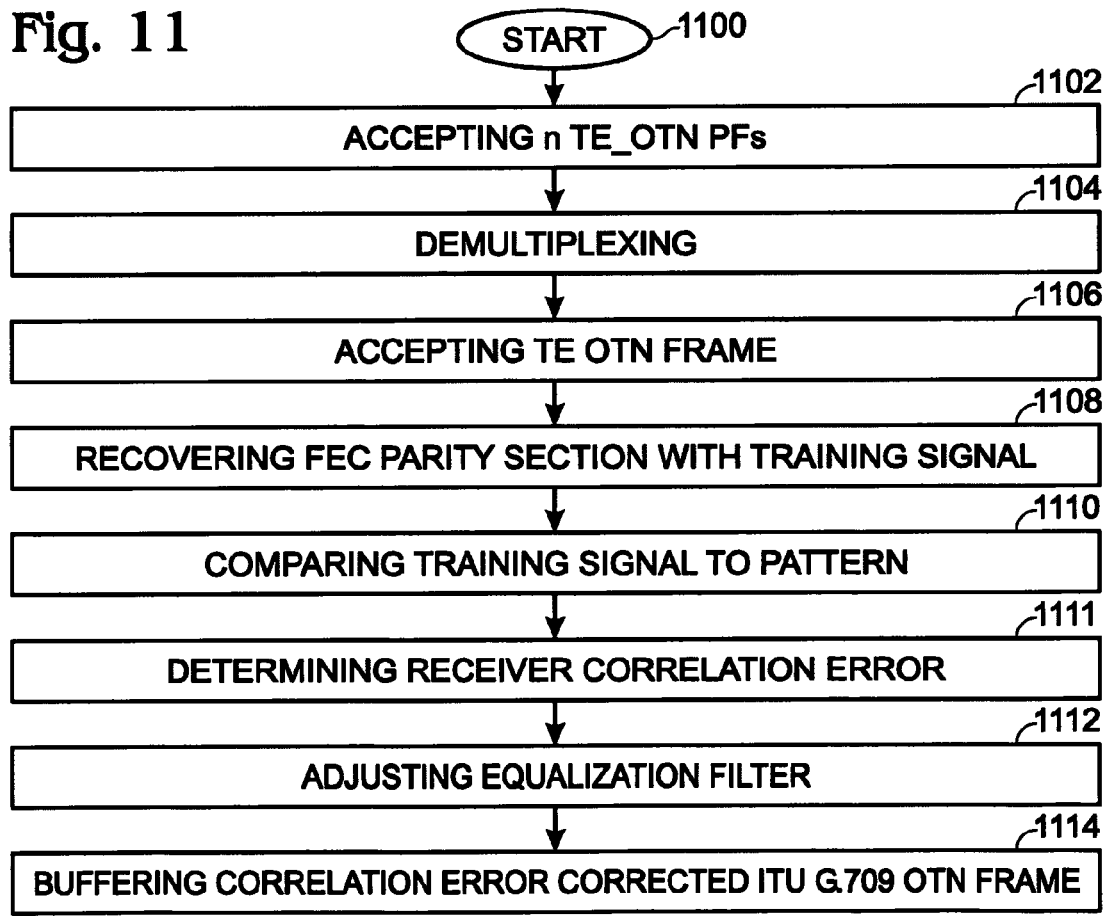

MULTI-CHANNEL OPTICAL TRANSPORT NETWORK TRAINING SIGNAL

BACKGROUND OF THE INVENTION

1. Field of the Invention

This invention generally relates to signal communications and, more particularly, to a training signal for use in a multi-channel Optical Transport Network (OTN) protocol.

2. Description of the Related Art

Signals may be communicated over parallel media using an inverse multiplexing scheme to concatenate channels. Conventionally, a virtual concatenation (VCAT) protocol uses an inverse multiplexing technique to split a signal into a payload of multiple Synchronized Optical Networking (SONET)/synchronous digital Hierarch (SDH) signals, which may be transmitted over independent routes. SONET/SDH protocols have been optimized for the transport of voice channels. VCAT uses multiple SONET/SDH containers to carry streams of data that would otherwise not fit in standard SONET/SDH containers, and is specified in ITU-T Recommendations G.707 (2007) and G.783 (2006).

The bandwidth is split equally among a set number of sub paths called Virtual Tributaries (VT). Several Virtual Tributaries form part of a Virtual Concatenation Group (VCG). The spawning of Virtual Tributaries to transport data across a VCAT-enabled network permits alternate paths to be used, which can be useful in congested networks. The Virtual Concatenation protocol uses byte-interleaving. For example, a Gigabit Ethernet (n, 1 Gb/s) may be distributed across (i) STS-nc VT's, where each VCG member carries a bandwidth equivalent of V=n/k [bits/second], n=1 Gb, and k=i. VCAT can also be used to concatenate multiple OTN channels using the same mechanism defined for SONET/SDH.

VCAT of multiple OTN channels will be used for transport of client signals with data rate of 100 Gbps, but this requires the monitoring of multiple channels and the use of additional bandwidth for the redundant overhead. The VCAT mechanism is suitable for use in physically parallel channels (e.g., different fiber). However, additional buffers are required for overcoming the skew (differential delay) between the different media.

100 gigabit per second (Gbps) OTN protocols are being developed where the OTN streams are carried in a "parallel fashion" at a bit-rate greater than 100 Gbps. Until recently, optical signals have been carried using 1 bit per symbol modulation techniques. However, the need for faster signal speeds means that return-to zero (RZ), non-return-to-zero (NRZ), and phase-shift keying (PSK) modulations techniques (1 bit per symbol) are no longer suitable.

A proposed solution for the transmission of high speed signals ($40/100$ Gbps and above) uses a combination of multiplexed orthogonal optical polarization and 2 bits per symbol modulation techniques on each of the two polarizations. This multiplexing and modulation scheme, polarization multiplexed (PM)-QPSK, is a combination of serial and parallel communication. The communication is not entirely serial because the two polarizations are not completely synchronized, but it is not entirely parallel because the physical medium and lambda are the same. However, OTN signals were originally defined for use in serial transmissions only. That is, OTN signals do not have characteristics inherent for efficient transmission and reception over "semi-parallel" channels. Since the semi-parallel channels may experience skew (differential delay), the recovery of a serial stream from parallel streams will require new techniques. While VCAT could potentially be used to solve this problem, a solution based on virtual concatenations would require a higher overall rate for the optical transmission, and multiple entities to be monitored.

It would be advantageous if a technique could be developed for more simply addressing the recovery of the OTN serial stream for high speed ($40/100$ Gbps and above) parallel stream networks.

SUMMARY OF THE INVENTION

The present invention presents a system and method for transmitting and receiving a training-enhanced (TE) OTN frame to be used in the context of transmitting and receiving high speed serial OTN signals.

Accordingly, a multi-channel ITU G.709 optical transport network (OTN) transmission method is provided. The method accepts a canonical ITU G.709 OTN frame including an OTU overhead (OH) section, and an ODU section. A forward error correction (FEC) parity section with a training signal is appended to the ITU G.709 OTN frame, to create a training-enhanced (TE) OTN frame. The TE OTN may be buffered in a tangible memory medium in preparation for striping. The training-enhanced OTN frame is then striped into n parallel streams, and n TE_OTN-PFs (Parallel Frames) are supplied.

In one aspect, the FEC parity section of the TE OTN frame includes FEC information from the canonical ITU G.709 OTN frame, as well as training signal. That is, the training signal does not fully occupy the FEC parity section. In another aspect, the FEC parity section of the TE OTN frame includes a user-defined communication channel (UDCC) having information concerning the training signal. For example, the UDCC may associate the training signal with the status of a remote receiver.

Also provided is a multi-channel ITU G.709 OTN receiving method. The method accepts n TE_OTN-PFs, and demultiplexes the n parallel streams in a TE OTN frame. The TE OTN frame is then accepted, and a FEC parity section with a training signal is recovered. The training signal is compared with a predetermined pattern to determine receiver correlation error. The calculated correlation error is used to change the internal parameters of an equalizer. An OTN frame, compliant with ITU G.709, is then provided with an OTU OH section and an ODU section.

Additional details of the above-described methods, as well as multi-channel ITU G.709 OTN transmitters and receivers are described below.

BRIEF DESCRIPTION OF THE DRAWINGS

FIG. 10 is a flowchart illustrating a multi-channel ITU G.709 OTN transmission method.

FIG. 11 is a flowchart illustrating a multi-channel ITU G.709 OTN receiving method.

DETAILED DESCRIPTION

Figure 1:
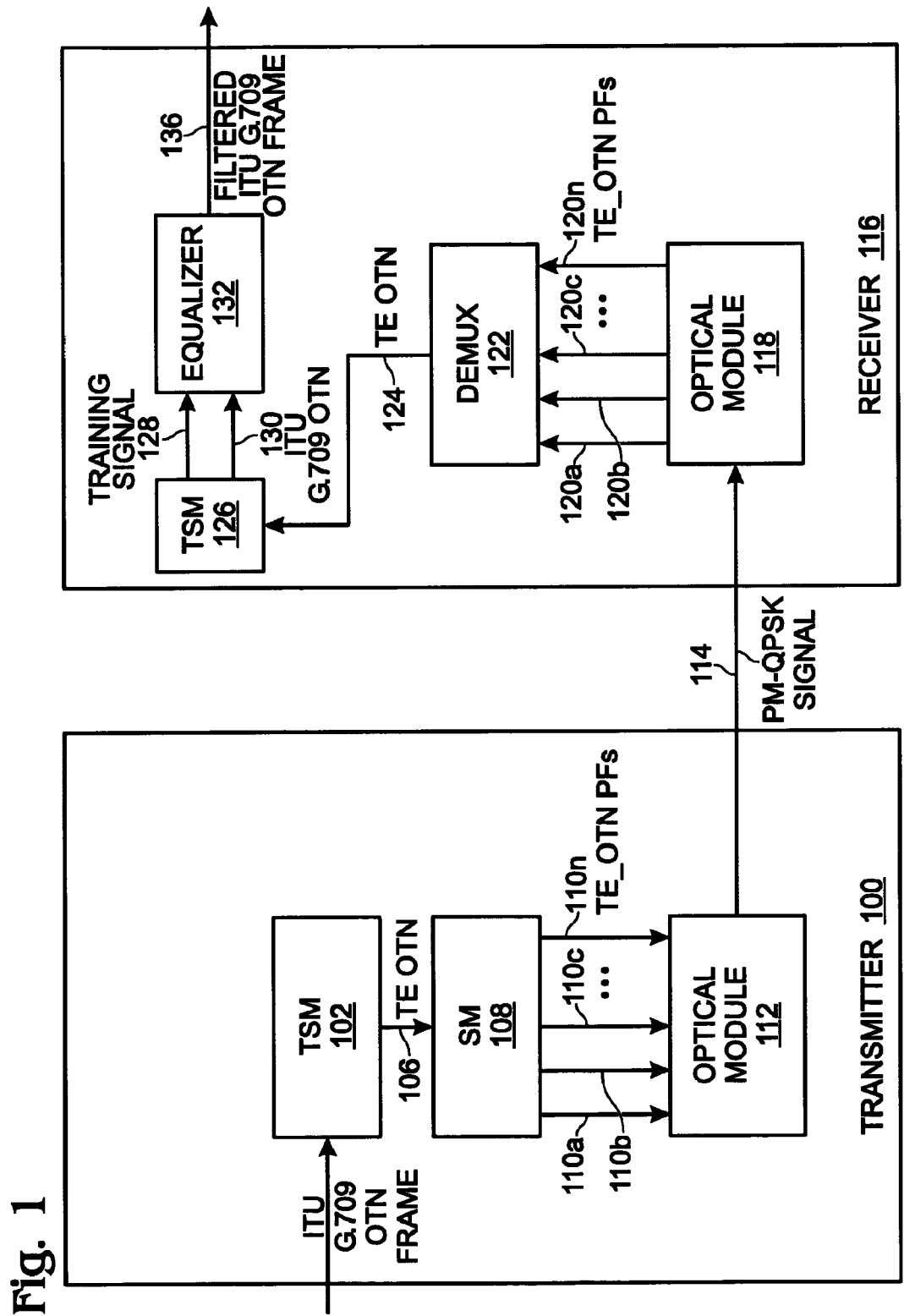
FIG. 1 is a schematic block diagram of a multi-channel ITU G.709 optical transport network (OTN) transmitter.

FIG. 1 is a schematic block diagram of a multi-channel ITU G.709 optical transport network (OTN) transmitter. The transmitter 100 comprises a training signal module (TSM) 102 having an input on line 104 to accept an ITU G.709 OTN frame including an OTU overhead (OH) section, and an ODU section. The training signal module 102 appends a forward error correction (FEC) parity section with a training signal to the ITU G.709 OTN frame, and supplies a training-enhanced (TE) OTN frame at an output on line 106. In one aspect, the TSM 102 selectively supplies the training signal in the FEC parity section. As explained in more detail below, the training signal may optionally be added upon the start of communications, or in the event that channel equalization is lost.

A striping module (SM) 108 has an input to accept the training enhanced OTN frame on line 106. The SM 108 strips (interleaves) the training-enhanced OTN frame into n parallel streams, supplying n TE_OTN-PFs (Parallel Frames) at an output on line 110. As shown in the figure, n=4. However, transmitter 100 is not necessarily limited to any particular value of n. The SM 108 stripes the TE OTN into n parallel streams using either a bit or multi-bit orientation. For example, if the multi-bit is a byte, the SM 108 interleaves byte sections of the TE OTN into each TE_OTN PF.

An optical module 112 accepts one pair of TE_OTN PF signals (e.g., signal paths 110a and 110b) as Ix and Qx electrical signal paths representing a pair of quadrature phase shift keying (QPSK) modulated signals. Optical module 112 accepts another pair of TE_OTN PF signals (e.g., signal paths 110c and 110n) as Iy and Qy electrical signals representing a pair of QPSK modulated signals. The optical module 112 converts the four signals into a PM-QPSK transmitted on line 114. Note: although 4 parallel signal paths are shown for simplicity, the system may include a larger or smaller number of signal paths in other aspects not shown. Likewise, although the system is described in the context of QPSK modulation, the system is not necessary limited to any particular order of modulation or modulation format.

Figure 2:
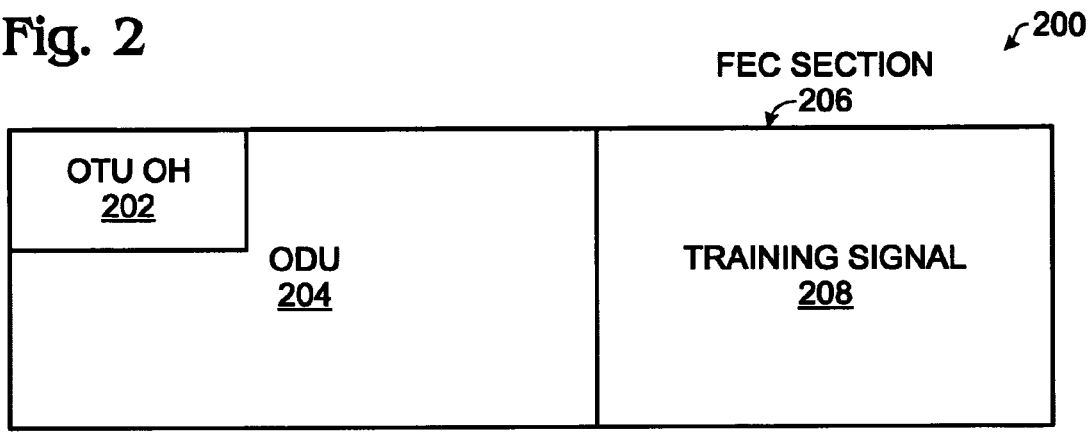
FIG. 2 is a schematic diagram depicting a first exemplary TE OTN frame.

FIG. 2 is a schematic diagram depicting a first exemplary TE OTN frame. The TE OTN frame 200 includes an OTU OH section 202, an ODU section 204, and an FEC parity section 206. In this aspect, the FEC parity section 206 is completely occupied by the training signal 208.

Figure 3:
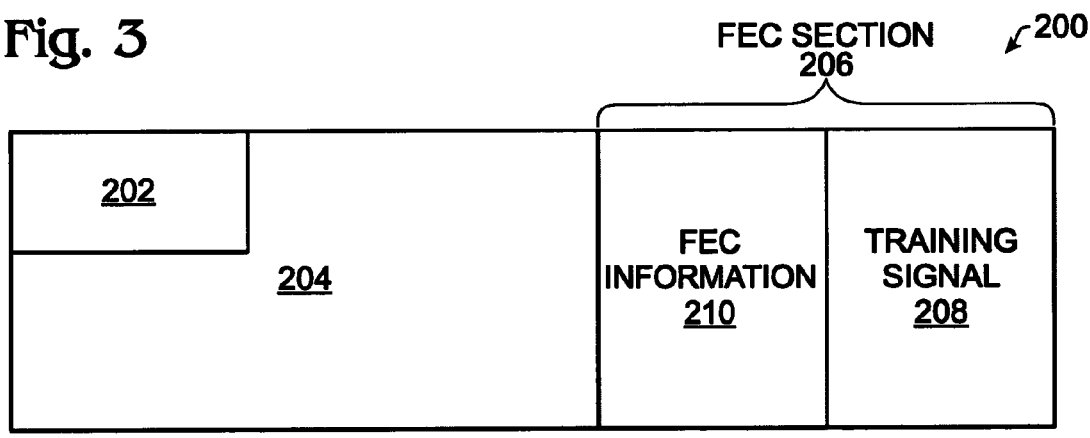
FIG. 3 is a schematic diagram depicting a second exemplary TE OTN frame.

FIG. 3 is a schematic diagram depicting a second exemplary TE OTN frame. In this aspect, the FEC parity section 206 includes actual FEC information 210 and the training signal 208. As shown, the training signal 208 follows the FEC information 210. However, in other aspects not shown, the training signal 208 precedes the FEC information 210, or the training signal 208 is distributed into sub-sections that are interspersed between FEC information sub-sections.

Figure 4:
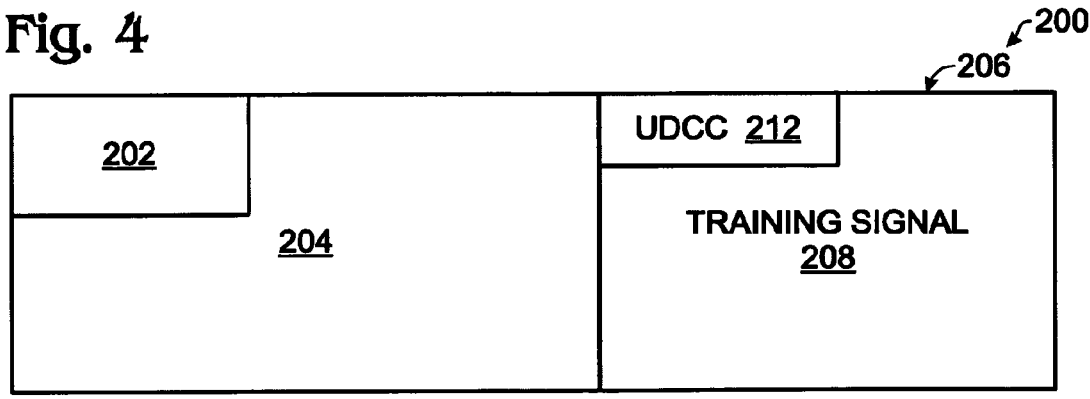
FIG. 4 is a schematic diagram depicting a third exemplary TE OTN frame.

FIG. 4 is a schematic diagram depicting a third exemplary TE OTN frame. In this aspect, the FEC parity section 206 includes a user-defined communication channel 212 (UDCC) in the FEC parity section 206 with information concerning the training signal 208. As shown, the training signal 208 follows the UDCC 212. However, in other aspects not shown, the training signal 208 precedes the UDCC 212, or the training signal 208 is distributed into sub-sections that are interspersed between UDCC sub-sections. For example, the UDCC 212 may include local receiver status information. Transmitter 100 may be part of a transceiver (not shown) that also includes a local receiver (not shown). In one aspect, the UDCC 212 is a field with a size in the range of 0 to 128 bytes.

Returning to FIG. 1, a multi-channel ITU G.709 OTN receiver 116 is also depicted. The receiver 116 comprises an optical module 118 to accept the PM-QPSK signals on line 114, and to provide one pair of TE_OTN PF signals (e.g., signal paths 120a and 120b) as Ix and Qx electrical signal paths. Optical module 112 also provides another pair of TE_OTN PF signals (e.g., signal paths 120c and 120n) as Iy and Qy electrical signals.

A demultiplexing module (DEMUX) 122 has an input on line 120 (120a-120n) to accept n TE_OTN-PFs (Parallel Frames). In this example, n=4. The DEMUX 122 demultiplexes the n parallel streams in a TE OTN frame supplied at an output on line 124. The DEMUX 122 may demultiplex the n parallel streams into the TE OTN using either a bit or multi-bit orientation.

A training signal module (TSM) 126 accepts the TE OTN on line 124. The TSM 126 recovers the FEC parity section with the training signal from the TE OTN. The TSM 126 supplies an ITU G.709 OTN frame on line 128. The ITU G.709 OTN frame includes an OTU OH section and an ODU section, as is conventional.

In some aspects, the receiver 116 includes an equalizer 132 to accept the training signal from the TSM on line 128 and the ITU G.709 OTN frame on line 130. The equalizer 132 compares the training signal with a predetermined pattern to calculate a receiver correlation error, and adjusts the parameters of an equalization filter in response to the calculated correlation error. The equalizer 132 supplies a filtered ITU G.709 OTN frame at an output on line 136.

A training signal is a long deterministic pattern, longer than any pattern available in a conventional ITU G.709 OTN frame. At the beginning of a message time, the receiver is not equalized. As a result, "0"s and "1"s are interpreted using a preset threshold. Using the preset threshold, the equalizer 132 attempts to find the predetermined pattern (training signal) that is repeated, frame after frame. Since inter-symbolic interference (ISI) typically exists, the interpretation of a bit depends on the bits that preceded it. However, a predetermined pattern of bits can be used to evaluate and correct the errors associated with ISI. Once the ISI, or correlation errors have been calculated based upon the known pattern, errors in non-predetermined data can be minimized. There are many different types of equalizers known in the art for correcting different parameter types.

An equalization (EQ) filter is usually adjustable, to compensate for the unequal frequency response of the channel, or some other signal processing circuit. An EQ filter permits one or more parameters to be adjusted that determine the overall shape of the filter's transfer function. Generally, equalizers operate on the parameters of frequency, Q (bandwidth), and gain. In digital communications, equalizers primarily provide an inverse of the channel impulse response.

As noted above, the FEC parity section may be completely occupied by the training signal, see FIG. 2. Alternately, the FEC parity section may include FEC information and the training signal, see FIG. 3. In another aspect, the TSM 126 recovers a UDCC in the FEC parity section. The UDCC may include remote receiver status information, and may have a field size in the range of 0 to 128 bytes.

In another aspect, the TSM 126 may compare the training signal with a predetermined pattern to correct for skew between the Ix, Qx, Iy, and Qy channels.

Functional Description

Figure 5:
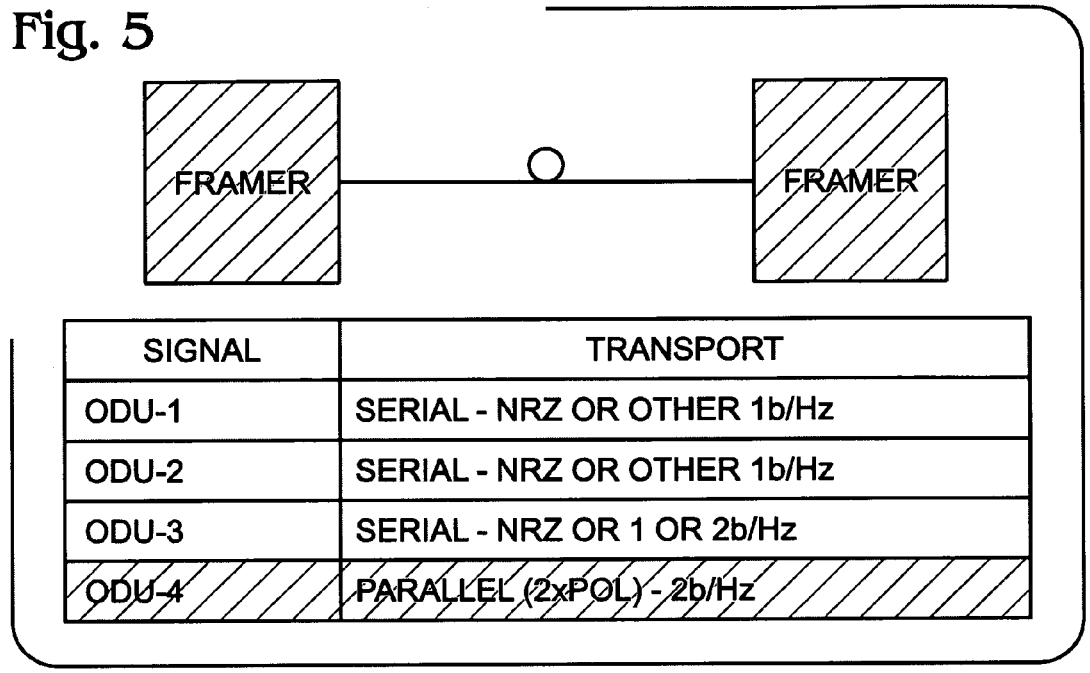
FIG. 5 is a diagram depicting basic Optical Transport system requirements.

FIG. 5 is a diagram depicting basic Optical Transport system requirements. ODU-1, ODU-2, and ODU-3 signals use a non-return-to-zero (NRZ) protocol at either 1 or 2 bits per Hertz. In contrast, the parallel frames of the ODU-4 signal are orthogonally polarized to operate at 2 bits per Hertz, per polarization channel.

Figure 6:
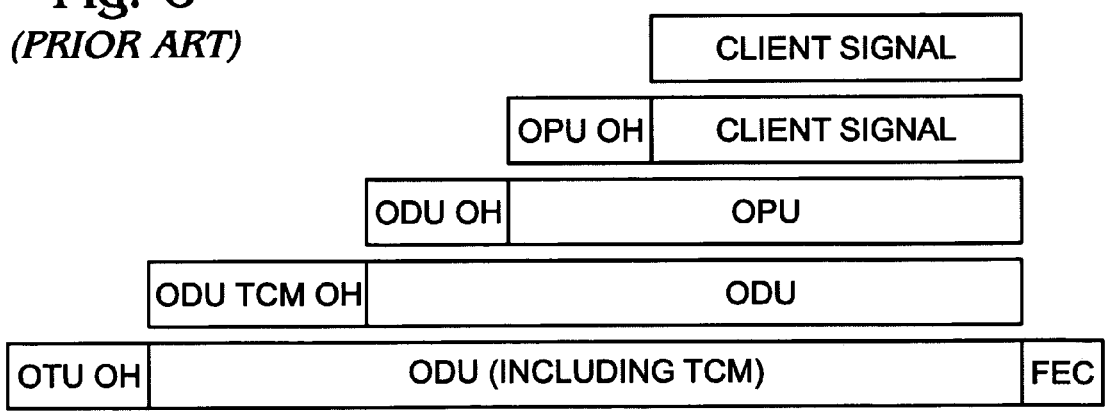
FIG. 6 is a diagram depicting the transportation of a client signal in an OTN network hierarchy (prior art).

FIG. 6 is a diagram depicting the transportation of a client signal in an OTN network hierarchy (prior art).

Figure 7:
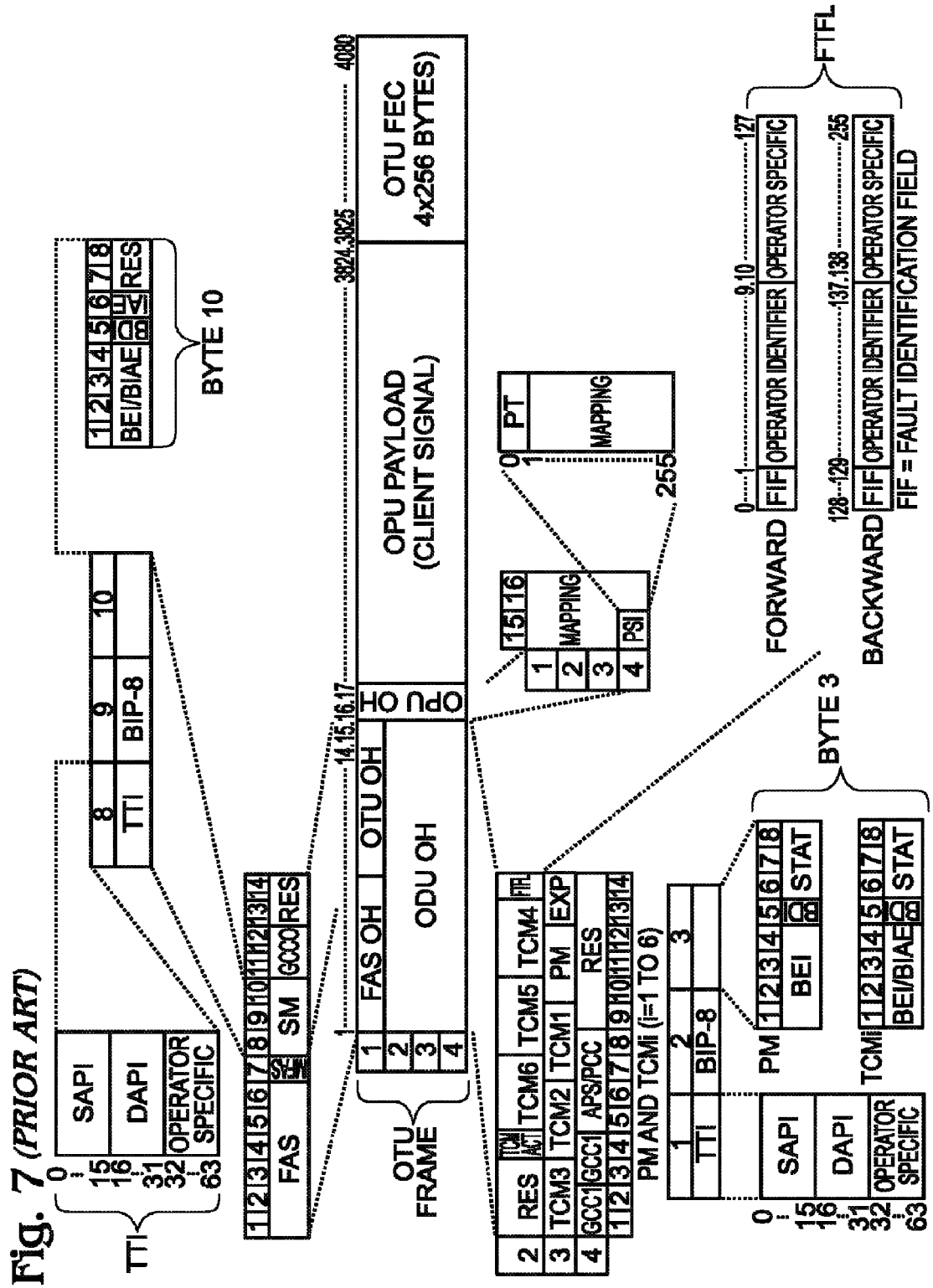
FIG. 7 is a diagram depicting the structure of an OTN frame and the utilization of bits/bytes for OH purposes (prior art).

FIG. 7 is a diagram depicting the structure of an OTN frame and the utilization of bits/bytes for OH purposes (prior art). Only the FAS (Frame Alignment Signal) portion of the frame is known a priori. There are other bits/bytes that may be deterministic, but that is only true if other information about the communication is known, or the previous value (in the previous frame) of the same byte was known. For example, the payload type does not change unless the MFAS is an incremental counter. More explicitly, out of 4080×4=16320 bytes, only 6 bytes are known a priori. The deterministic (FAS) repeats periodically at the beginning of each frame.

The FAS was defined as a predetermined pattern sufficiently long to prevent false frames in serial communications. However, in a parallel communication system such as the Dual Polarization systems proposed for the transport of 100 Gbps client signals, the currently defined FAS would be split between the two polarizations.

Figure 8:
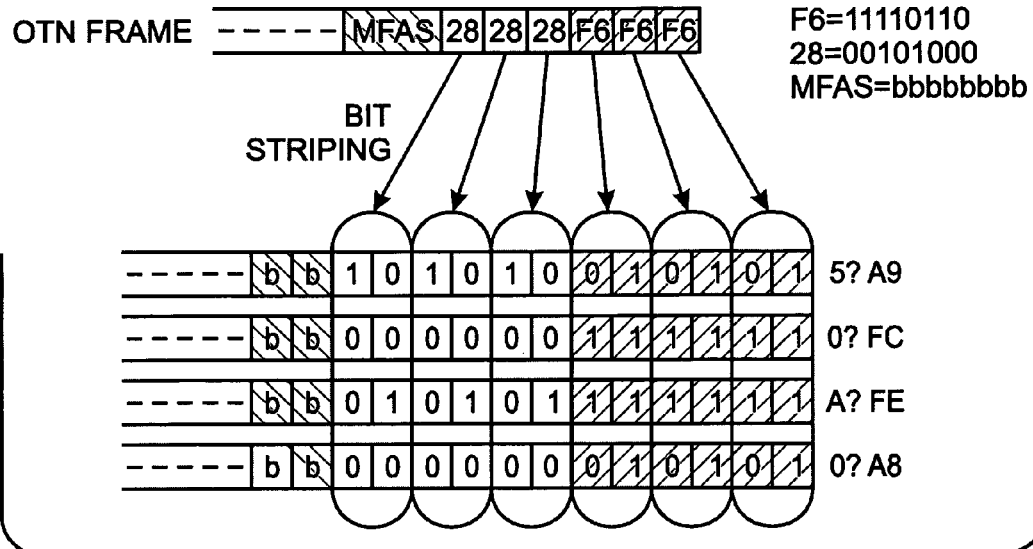
FIG. 8 is a diagram depicting OTN Frame BitMuxing in polarization multiplexed quadrature phase shift keying (PM-QPSK).

FIG. 8 is a diagram depicting OTN Frame BitMuxing in polarization multiplexed quadrature phase shift keying (PM-QPSK). In addition to being split between two polarizations, the FAS is split between i and q components inside each of the polarizations as shown. The relatively long pattern of 6 bytes in the conventional OTN frame (as shown—HEX: 28, 28, 28, F6, F6, and F6) is interleaved so that each parallel stream includes a 2-byte pattern. The present invention provides a longer pattern for each parallel stream than is provided by a conventional ITU G.709 OTN frame.

When receiving a PM-QPSK signal, a receiver block of a communication system must accomplish the following tasks in order to recover the data and clock from the incoming signal:

Recognize each bit. Bit recognition requires the receiver to be equalized to the channel. Most of equalization techniques are based on equalization training via known patterns;

Recognize the components of the signal on each of the two polarizations; and,

Align the components of the signals coming from each of the two polarizations.

However, the current definition of the OTN frame and OTN systems cannot be used to efficient communicate PM-DQPSK signals at high speeds. In order to solve this problem, a longer training sequence is required.

As shown in FIGS. 2-4, a training signal pattern can be embedded in the area of an OTN frame conventionally reserved for FEC. In one aspect, the training sequence is embedded in the FEC section until communications are established, and the receiver is equalized and aligned. After this startup condition, the conventional use of the FEC section can be resumed with the removal of the training signal. To this end, communicating transmitter (TX) and receiver (RX) entities work in concert in order to communicate the end of the startup condition.

Figure 9:
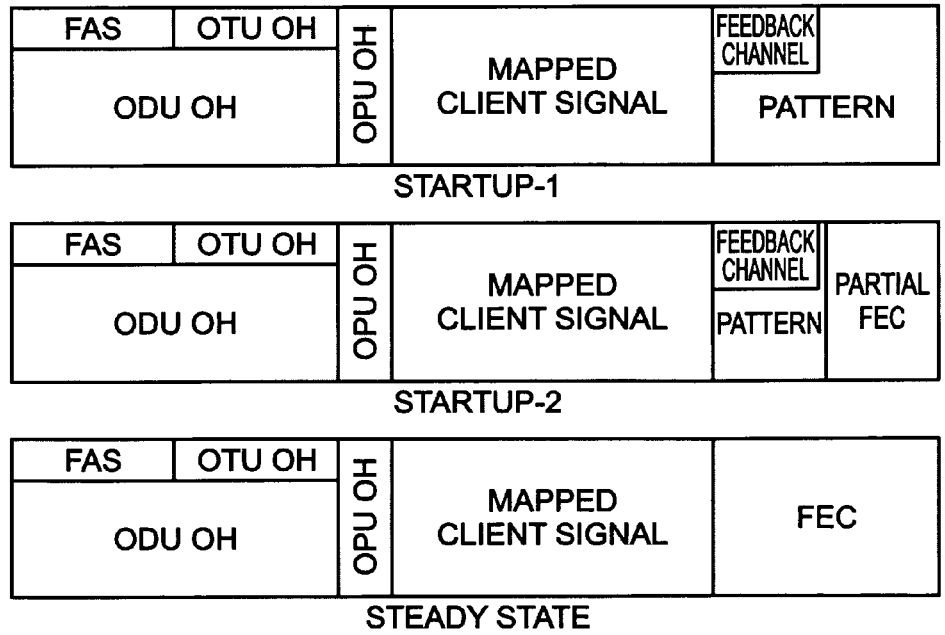
FIG. 9 is a diagram depicting a TE OTN with two different startup conditions using a training signal, contrasted with a conventional steady-state OTN frame.

FIG. 9 is a diagram depicting a TE OTN with two different startup conditions using a training signal, contrasted with a conventional steady-state OTN frame. Startup condition 2 can also be used during communications, at the cost of giving up some, but not all, of the FEC gain. Further, "stuffing" bits in the FEC section may be used for communication (UDCC) during the startup condition.

Alternately expressed, the training signal may be an equalization tone. As shown in startup condition 2, the equalization tone can be embedded in a portion of the FEC area conventionally used for the inner parity. The tone would be ON until the channel is established (deskewed and equalized). During this time, only the outer code FEC is used and there is less gain from the FEC during this time. Once the channel is equalized, the inner code can be turned back ON.

Advantageously, the training signal or equalization tone can be turned ON again during a time when traffic on the link is live. For example, if the link starts to experience too many errors, the equalization process can be restarted using the FEC-embedded training signal. Thus, the equalizer can be retrained during live traffic, while only giving up some of the FEC gain associated with the inner code. In one aspect, the training signal is a Barker code with 1, 2, or 4 bits interleaved.

FIG. 10 is a flowchart illustrating a multi-channel ITU G.709 OTN transmission method. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1000.

Step 1002 accepts an ITU G.709 OTN frame including an OTU OH section, and an ODU section. Step 1004 appends a FEC parity section with a training signal to the ITU G.709 OTN frame. In some aspects, Step 1004 selectively adds the training signal to the FEC parity section. In a tangible memory medium, Step 1006 buffers at least a portion of a TE OTN frame in preparation for striping. Step 1008 stripes the training-enhanced OTN frame into n parallel streams. Step 1010 supplies n TE_OTN-PFs.

In one aspect, appending the FEC parity section in Step 1004 includes appending a FEC parity section with FEC information and the training signal. In another aspect, Step 1004 appends a FEC parity section with a UDCC having information concerning the training signal.

FIG. 11 is a flowchart illustrating a multi-channel ITU G.709 OTN receiving method. The method starts at Step 1100. Step 1102 accepts n TE_OTN-PFs. Step 1104 demultiplexes the n parallel streams in a TE OTN frame. Step 1106 accepts the TE OTN frame. Step 1108 recovers a FEC parity section with a training signal from the TE OTN. In a tangible memory medium, Step 1114 buffers at least a portion of an ITU G.709 OTN frame including an OTU OH section and an ODU section.

In one aspect, Step 1110 compares the training signal with a predetermined pattern. Step 1111 determines a receiver correlation error. Step 1112 adjusts an equalization filter in response to determining the receiver correlation error. Then, supplying the ITU G.709 OTN frame in Step 1114 includes supplying a filtered ITU G.709 OTN frame.

In one aspect, recovering the FEC parity section in Step 1108 includes recovering a FEC parity section with FEC information and the training signal. In another aspect, Step 1108 recovers a UDCC in the FEC parity section.

Systems and methods have been provided for communicating information in a multi-channel ITU G.709 optical transport network. Examples of specific training patterns and the placement of these patterns have been given to illustrate the invention. Likewise, the invention has been described in the context of an optical network. However, the invention is not necessarily limited to these examples. Other variations and embodiments of the invention will occur to those skilled in the art.

We claim:

1. A multi-channel ITU G.709 optical transport network (OTN) transmitter, the transmitter comprising:
a training signal module (TSM) having an input to accept an ITU G.709 OTN frame including an OTU overhead (OH) section and an Optical channel Data Unit (ODU) section, the training signal module appending a forward error correction (FEC) parity section with a training signal having a deterministic bit value pattern, and supplying a training-enhanced (TE) OTN frame at an output, forming a channel with an ITU G.709 OTN receiver;
a striping module (SM) having an input to accept the training enhanced OTN frame, the SM striping the training-enhanced OTN frame into n parallel streams and supplying n TE OTN-PFs (Parallel Frames) at an output, forming n channels: and,
wherein the TSM supplies the TE OTN frame including the ODU section and the training signal in the FEC parity section while the channel is being equalized, and ceases to supply the training signal in the OTN frame FEC parity section after the channel is equalized.

2. The transmitter of claim 1 wherein the training signal module supplies the FEC parity section completely occupied by the training signal.

3. The transmitter of claim 1 wherein the training signal module supplies the FEC parity section with FEC information and the training signal.

4. The transmitter of claim 1 wherein the training signal module adds a user-defined communication channel (UDCC) in the FEC parity section with information concerning the training signal.

5. The transmitter of claim 4 wherein the training signal module adds a UDCC including local receiver status information.

6. The transmitter of claim 4 wherein the training signal module adds a UDCC with a field size in a range of 0 to 128 bytes.

7. The transmitter of claim 1 wherein the SM stripes the TE OTN into is parallel streams using an orientation selected from a group consisting of a bit and a multi-bit.

8. The transmitter of claim 1 wherein the TSM selectively adds the training signal to the FEC parity section.

9. A multi-channel ITU G.709 optical transport network (OTN) transmission method, the method comprising:
accepting a plurality of ITU G.709 OTN frames, each including an OTU overhead (OH) section, and an Optical channel Data Unit (ODU) section;
appending a forward error correction (FEC) parity section with a training signal having a deterministic bit value pattern to each ITU G.709 OTN frame while a channel is being equalized to an ITU G.709 OTN receiver;
supplying training-enhanced (TE) OTN frames to the ITU G.709 OTN receiver, each TE OTN frame including the ODU section and the training signal in the FEC parity section, as follows:
striping the training-enhanced OTN frame into n parallel streams;
supplying TE OTN-PFs (Parallel Frames) via n channels; and,
subsequent to equalizing the channel, ceasing to add the training signals to the FEC parity sections of the OTN frames supplied to the ITU G.709 receiver.

10. The method of claim 9 wherein appending the FEC parity section includes appending a FEC parity section with FEC information and the training signal.

11. The method of claim 9 wherein appending the FEC parity section includes appending a FEC parity section with a user-defined communication channel (UDCC) having information concerning the training signal.

12. The method of claim 9 wherein appending the FEC parity section with a training signal to the ITU G.709 OTN frame includes selectively adding the training signal to the FEC parity section.

13. A multi-channel ITU G.709 optical transport network (OTN) receiver, the receiver comprising:
a demultiplexing module (DEMUX) having an input to accept n TE OTN-PFs (Parallel Frames), the DEMUX demultiplexing n parallel streams in a training-enhanced (TE) OTN frame supplied at an output;
a training signal module (TSM) having an input to accept the TE OTN frame, the TSM recovering an Optical channel Data Unit (ODU) section and a forward error correction (FEC) parity section with a training signal having a deterministic bit value pattern from the TE OTN, and supplying an ITU G.709 OTN frame including an OTU overhead (OH) section and the ODU section at an output; and,
an equalizer having an input to accept the training signal and the ITU G.709 OTN frame from the TSM, the equalizer comparing the training signal with the deterministic bit value pattern to calculate a receiver correlation error, adjusting the parameters of an equalization filter in response to the calculated correlation error, and supplying a filtered ITU G.709 OTN frame at an output.

14. The receiver of claim 13 wherein the training signal module recovers a FEC parity section completely occupied by the training signal.

15. The receiver of claim 13 wherein the training signal module recovers a FEC parity section with FEC information and the training signal.

16. The receiver of claim 13 wherein training signal module recovers a user-defined communication channel (UDCC) in the FEC parity section.

17. The receiver of claim 16 wherein the training signal module recovers a UDCC including remote receiver status information.

18. The receiver of claim 16 wherein the training signal module recovers a UDCC with a field size in a range of 0 to 128 bytes.

19. The receiver of claim 13 wherein the DEMUX demultiplexes the n parallel streams into the TE OTN using an orientation selected from a group consisting of a bit and a multi-bit.

20. A multi-channel ITU G.709 optical transport network (OTN) receiving method, the method comprising:
accepting n training-enhanced (TE) OTN-PFs (Parallel Frames);
demultiplexing the n parallel streams in a TE OTN frame;
recovering an Optical channel Data Unit (ODU) section and a forward error correction (FEC) parity section with a training signal having a deterministic bit value pattern from the TE OTN;
in a tangible memory medium, buffering at least a portion of an ITU G.709 OTN frame including an OTU overhead (OH) section and the ODU section;
comparing the training signal with a predetermined pattern;
determining a receiver correlation error;
adjusting an equalization filter in response to determining the receiver correlation error; and,
supplying a filtered ITU G.709 OTN frame.

21. The method of claim 20 wherein recovering the FEC parity section includes recovering a FEC parity section with FEC information and the training signal.

22. The method of claim 20 wherein recovering the FEC parity section includes recovering a user-defined communication channel (UDCC) in the FEC parity section.

* * * * *